Jan. 17, 1967 J. E. BURNS 3,299,217

AUXILIARY INTERCONNECTING UNIT FOR MULTI-LINE SUBSCRIBER TELEPHONE SYSTEM

Filed Oct. 31, 1963 5 Sheets-Sheet 1

INVENTOR
J. E. BURNS
BY Richard C. Levy
ATTORNEY

Jan. 17, 1967 J. E. BURNS 3,299,217

AUXILIARY INTERCONNECTING UNIT FOR MULTI-LINE SUBSCRIBER TELEPHONE SYSTEM

Filed Oct. 31, 1963 5 Sheets-Sheet 2

Jan. 17, 1967 J. E. BURNS 3,299,217

AUXILIARY INTERCONNECTING UNIT FOR MULTI-LINE SUBSCRIBER TELEPHONE SYSTEM

Filed Oct. 31, 1963 5 Sheets-Sheet 4

3,299,217
Patented Jan. 17, 1967

3,299,217

AUXILIARY INTERCONNECTING UNIT FOR MULTI-LINE SUBSCRIBER TELEPHONE SYSTEM

James E. Burns, Eatontown, N.J., assignor to Bell Telephone Laboratories, Incorporated, New York, N.Y., a corporation of New York Filed Oct. 31, 1963, Ser. No. 320,297
4 Claims. (Cl. 179—99)

This invention relates to telephone station apparatus, and more particularly, to an auxiliary interconnecting unit for linking a station set employing nonlocking keys to the switching equipment of a multiline subscriber telephone system.

Most presently available multiline subscriber telephone systems employ station sets having locking-type keys for effecting the normal complement of service features such as line selection, hold and the like. As is familiar to those skilled in the art, locking-type keys comprise a group of manually operable switches having a common latch arrangement for maintaining one of the switches in the actuated condition until another of the switches is actuated. In the usual case, each line of the system to which a particular station set has access terminates in that set at a separate switch of the key. The speech circuit of that station set terminates commonly in all line-associated switches of the key. Accordingly, in order to complete a voice path between a station set's speech circuit and a line, it is necessary that the switch associated with the desired line be actuated. While this procedure has not been found unduly burdensome in instances where a station set terminates in only a few lines, confusion may result if a set has access to many lines and a called subscriber, to answer a call, must determine hurriedly the line upon which the incoming call is arriving. Although various lamp signaling arrangements have been devised to facilitate proper line selection at a station set, in telephone systems having sets which have access to many lines, most of which may be in use upon the arrival of a call, the lamps often present a confusing display prompting the called subscriber to falsely select several different lines before selecting the correct one.

Accordingly, an important object of the invention is to simplify line selection procedures in a telephone station set.

Another object of the invention is to establish connections automatically between the speech circuit of a telephone set and the conductors of a line upon which a call to that set is arriving.

Another object of the invention is to initiate a connection between the speech circuit of a telephone set and a particular one of several idle lines to which the set has access by merely removing the handset from its cradle.

A general object of the invention is to render telephone sets employing nonlocking keys compatible for use with switching equipment adapted to respond to locking keys.

These and other objects of the invention are achieved by combining with a station set an auxiliary linking unit having an individual relay, or other suitable switching device, through which each line to which the set has access is connected to the set's speech circuit. Means are provided for automatically operating the relays of the linking unit upon the arrival of incoming calls over lines respectively associated with the relays, and for maintaining the relays operated until the completion of a call.

One feature of the invention resides in an arrangement for automatically establishing a connection between the speech circuit of the telephone set and a line upon which an incoming call is arriving.

Another feature of the invention concerns a lockout circuit for preventing the connection of the speech circuit to more than one line at a time.

Another feature of the invention relates to a preference circuit for automatically connecting the speech circuit of a telephone set to a predetermined line by merely lifting the handset from its cradle.

Still another feature of the invention concerns a timing circuit for releasing the connection between a station set and a line if a call is not initiated in a predetermined time after the connection is established.

The foregoing and other objects and features of the invention will be more thoroughly understood by reference to the following detailed description of an illustrative embodiment of the invention in conjunction with the accompanying drawings of which:

Figures 1, 6:
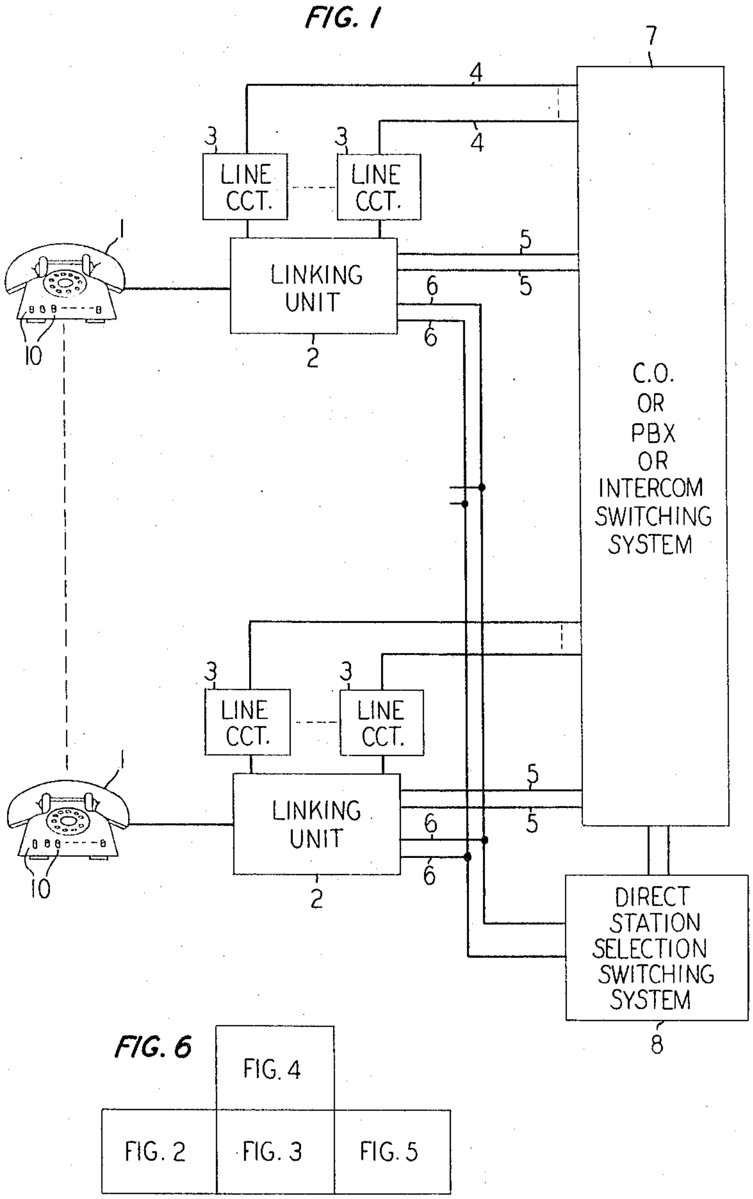
FIG. 1 is a telephone system embodying the present invention.
FIG. 6 is a diagram showing the working arrangement of FIGS. 2 through 5.

With reference to FIG. 1, a block diagram is illustrated of a subscriber telephone system employing the present invention. As shown, the system comprises a plurality of telephone station sets 1, each of which incorporates a bank of nonlocking keys 10 for performing the various services offered by the system. For example, several of the keys in each set are so-called line selection keys which are individually associated with different outgoing lines of the set and, when momentarily depressed, initiate seizure of an associated line. Others of the keys 10 in each set are so-called direct station selection keys which are individually associated with other station sets of the system and, when momentarily depressed, initiate the establishment of a speech path between a calling station set and the station set associated with the depressed key. In addition to the nonlocking keys each set is equipped with a hold key which, when momentarily depressed, releases an established connection between a station set and a line, but maintains the line in the seized, or occupied, condition.

Associated with each station set 1 is an individual linking unit 2 through which the speech and signaling circuits of the sets are selectively extended to the remaining portions of the system. In accordance with the invention a typical linking unit 2 includes a concentrator portion which automatically connects the tip and ring, or speech, conductors of a station set to a line upon which an incoming call is arriving, and which also selectively connects the tip and ring conductors of a station set to a desired line in response to the momentary depression of a line selection key 10. Also, the concentrator portion of linking unit 2 includes circuitry for automatically connecting, without the necessity of depressing a line selection key 10, the tip and ring conductors of a station set to a preferred line when the handset is lifted from its cradle. The various lines 4 to which a station set has access originate from a suitable switching system 7 such as a telephone central office, a PBX or an intercommunication switching system such as the one disclosed in U.S. Patent 2,883,457, issued April 21, 1959 to H. T. Carter et al., and enter linking units 2 via line circuits 3. Linking units 2 also include timing circuitry for releasing a connection between a station set and a line if a call is not initiated over that line within a predetermined time after the connection is established. Furthermore, linking units 2 include a lockout arrangement for preventing the interruption of an established connection between a station set and one line when an incoming call arrives on another of the set's lines.

As aforementioned, linking units 2 also extend the signaling circuits of station sets 2 to the switching equipment of blocks 7 and 8. Thus, conductors 5 transmit incoming call indication signals from switching system 7 to both linking units 2 and to the ringer of station sets 1. Also, signals generated by the momentary depression of the direct-station selection keys of station sets 1 are transmitted from linking units 2 and over conductors 6 to a direct station selection switching system 8 such as the one disclosed in copending patent application Serial No. 115,799, filed June 8, 1961 by C. Breen et al., now Patent 3,210,475, issued October 5, 1965. The exact manner in which the speech and signaling circuits extend through linking units 2 will be explained in detail below. It is to be understood that the particular switching systems designated 7 and 8 form no part of the present invention, but are shown herein merely to present the invention in the light of a complete communication system.

Figure 2:
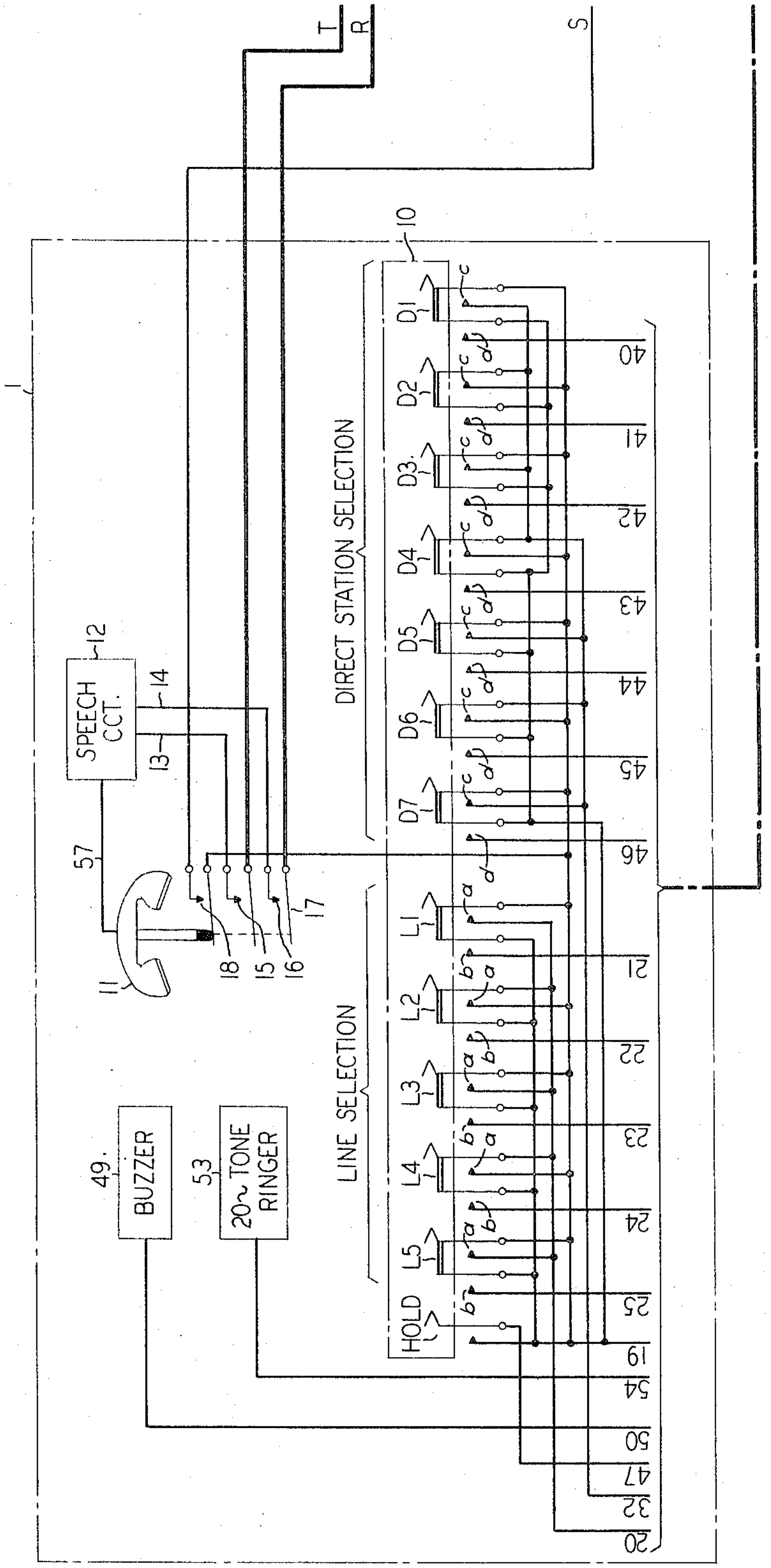
FIG. 2 is a circuit schematic of a telephone station set employing nonlocking keys.
Figure 3:
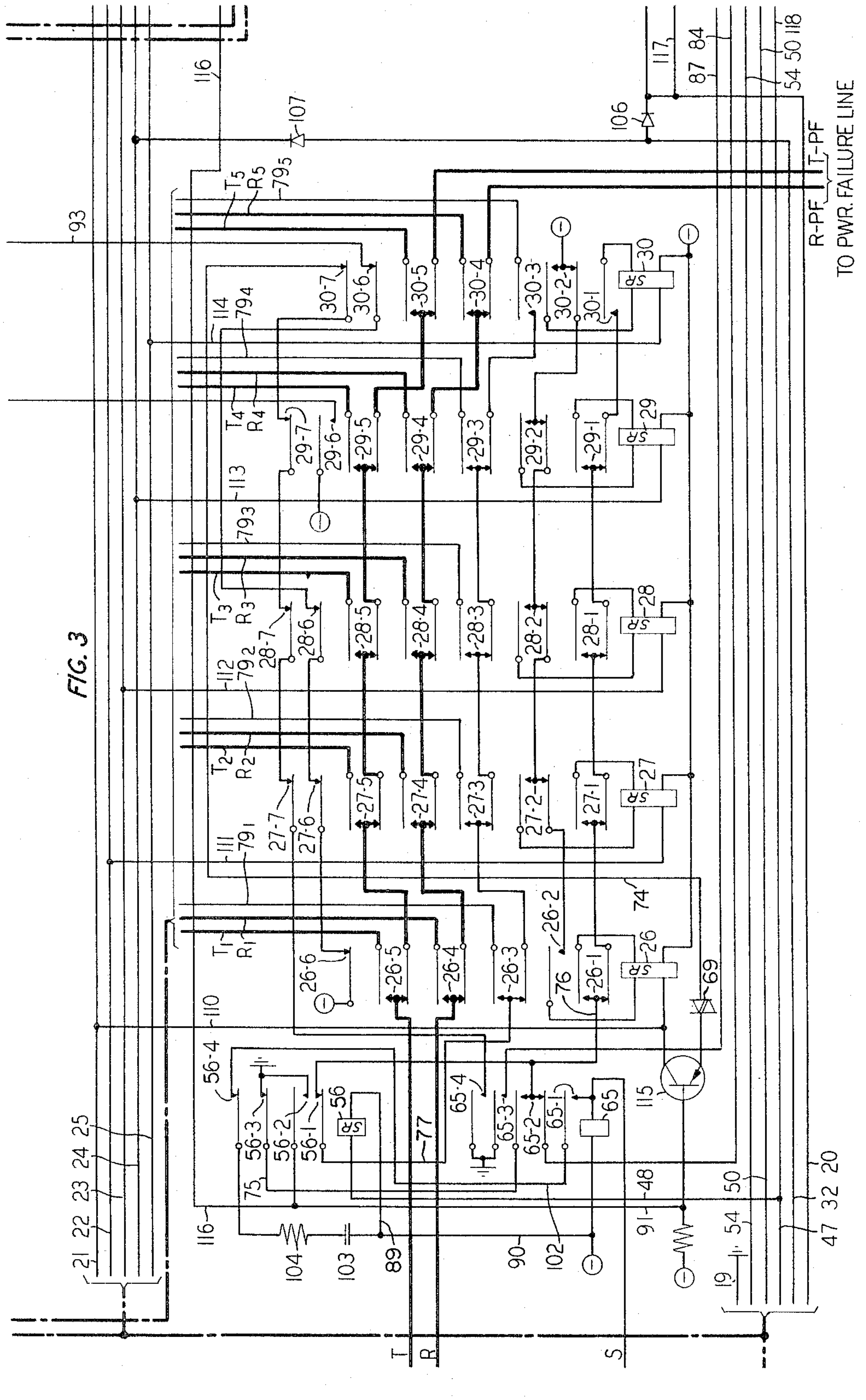
FIGS. 3, 4 and 5 show an auxiliary linking unit for interconnecting a telephone station set employing nonlocking keys to a telephone switching office.
Figure 4:
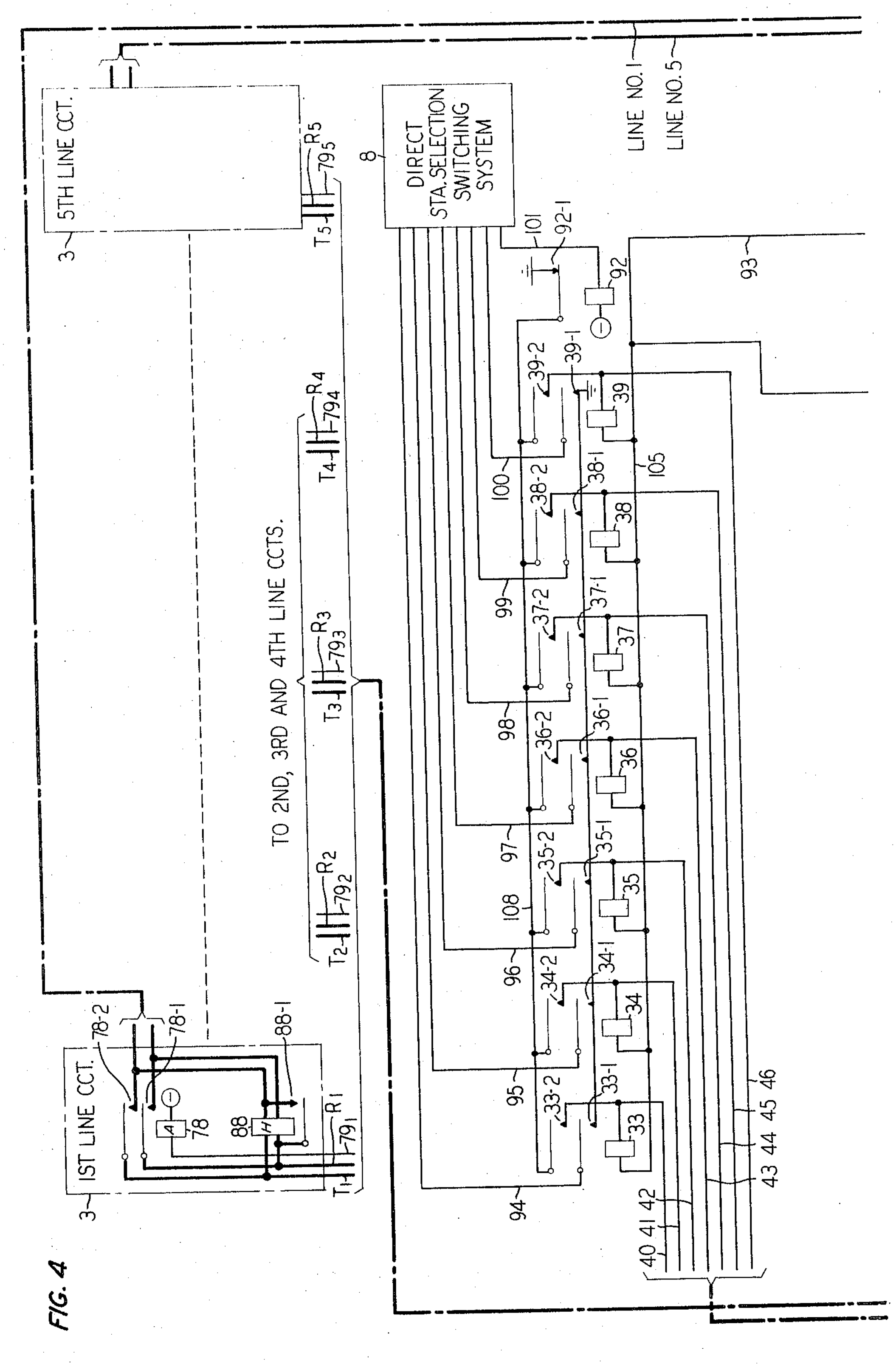

FIGS. 2 through 5 illustrate a typical subscriber set 1 and its associated linking unit 2. As shown in FIG. 2, station set 1 comprises a handset 11 coupled by a cable 57 to a conventional telephone speech circuit 12, which in turn is connected by leads 13 and 14, and contacts 15 and 16 of switchhook 17 to the output speech conductors of the set labeled T and R. Connected to contacts 18 of switchhook 17 is a conductor S through which off-hook, or supervisory, signals are transmitted to linking unit 2. As aforementioned, station set 1 includes a plurality of nonlocking keys 10. In the particular embodiment of the invention described herein, keys 10 are divided into three distinct groups; namely, five line selection keys labeled L1 through L5, seven direct-station selection keys labeled D1 through D7, and a hold key. Each of the line selection keys L1 through L5 is arranged to actuate an individual pair of contacts *a* and *b*. The *a* contacts of each key couple the ground potential on lead 19 to a time-out circuit in linking unit 2 over a conductor 20, and the *b* contacts couple the ground potential on lead 19 to the windings of line seizing relays 26 through 30 over conductors 21 through 25, respectively.

Direct-station selection keys D1 through D7 are identical to line selection keys L1 through L5, each being arranged to actuate individual contacts *c* and *d*. The *c* contacts of each direct-station selection key couple the ground potential of lead 19 to the aforementioned time-out circuit over lead 32, and the *d* contacts couple the ground potential on lead 19 to the windings of direct-station selection relays 33 through 39 over conductors 40 through 46, respectively. The hold key is arranged to actuate a single set of contacts which couples the ground potential on lead 19 to the winding of relay 56 in linking unit 2 over conductors 47 and 48. Station set 1 also includes a buzzer 49 which is connected by lead 50 and contacts 58–1 of relay 58 to a negative source of potential, and a tone ringer 53 for indicating the presence of incoming calls which is connected to a ringing supply, for example a 20-cycle per second tone generator 59, through conductor 54, contacts of relay 58–3 of relay 58 and contacts 60–3 of relay 60.

In order to clarify the terminology used hereinafter, several definitions are set forth below relating to the relays and associated contacts shown in the drawing. For purposes of this specification, "make contacts" are defined as a pair of relay actuated electrical contacts which normally present an open circuit path, but when the actuating relay is operated, present a closed circuit path. Conversely, "break contacts" are defined as relay actuated electrical contacts which normally present a closed circuit path, but when the actuating relay is operated, present an open circuit path. "Transfer contacts" are defined as a single switch comprising a set of break contacts and a set of make contacts which alternately switch a single input signal between a pair of output terminals. In the drawing, each set of make, break and transfer contacts is designated by a separate numeral which follows the reference numeral identifying its actuating relay. For example, the first set of contacts of line seizing relay 26, which in this case are transfer contacts, are marked 26–1. The second set of contacts of relay 26, which are make contacts, are marked 26–2. The last contacts of relay 26, which are break contacts, are marked 26–6. As a further aid to simplifying the drawing, the conductors which carry speech signals are shown in heavy line, while all other conductors are of single thickness.

The speech conductors T and R of station set 1 enter linking unit 2 through transfer contacts 26–4 and 26–5. These last-mentioned transfer contacts are arranged such that when line seizing relay 26 is unoperated, speech circuit 12 of station set 1 is extended to transfer contacts 27–4 and 27–5, but when line seizing relay 26 is operated, the speech circuit is coupled via conductors T1 and R1 to the line circuit 3 associated with line No. 1. Likewise, transfer contacts 27–4 and 27–5 are arranged such that when line seizing relay 27 is unoperated, the speech circuit of the station set is further extended to transfer contacts 28–4 and 28–5, but when relay 27 is operated, the speech circuit is coupled by conductors T2 and R2 to the line circuit 3 associated with line No. 2. The corresponding transfer contacts of line seizing relays 28, 29 and 30 are similar to previously described transfer contacts of relays 26 and 27, except that from the transfer contacts 30–4 and 30–5 of relay 30, the speech conductors are extended directly to switching system 7 via conductors T–PF and R–PF so that in the event of a power failure in linking unit 2, a through connection from the station set to an outside line can be established even though the line seizing relays fail to operate.

Each of the line seizing relays 26 through 30 has an upper and a lower winding. The lower winding serves to initially operate the relay, and the upper winding serves to maintain the relay operated through a locking circuit including the lower-most transfer contacts and make contacts of each line seizing relay. More specifically, the first terminals of the lower windings of line seizing relays 26 through 30 are connected directly to negative battery, while the second terminals of the lower windings are connectable to ground via conductors 21 through 25 and the *b* contacts of line selection keys L1 through L5, respectively. The aforementioned second terminals are also connectable by conductors 110 through 114 and break contacts 64–2 through 64–6, respectively, to a ground in central office, PBX, or intercommunication switching system 7 which is made available when an incoming call is arriving for station set 1. The manner in which a telephone switching system, such as the one represented generally by the reference numeral 7, applies ground potential to signaling conductors 110 through 114 to indicate the presence of an incoming call is well known to those skilled in the art, and consequently need not be described in detail herein.

The lower winding of line seizing relay 26 is also connectable to ground through the collector to emitter path of transistor 115, conductor 74, break contacts 30–7, 29–7, 28–7 and 27–7, and make contacts 65–4 of supervisory relay 65. However, if any of the lines of the system are seized by the central office, PBX or intercommunication switching system 7, transistor 115 is disabled by the application of a ground signal to its base through conductors 91 and 116. The circuit described above comprises a preference arrangement for automatically seizing line No. 1, without the necessity of depressing the line selection key associated with that line, by merely lifting handset 11 from its cradle provided that no other lines are seized at that time.

Supervisory relay 65 controls the function of off-hook supervision. As shown, one terminal of the winding of relay 65 is connected directly to negative battery, while the other terminal is connected through switchhook 18 of station set 1 to the ground on conductor 19. Consequently, whenever station set 1 is placed in the off-hook condition, relay 65 is operated through the path just described. Relay 65 includes a slow release path comprjsing make contacts 65–1, the winding of relay 65, conductor 102, capacitor 103, resistor 104, break contacts 56–4, and conductor 105. Owing to this slow release path, switchhook "flashing" may be performed without releasing supervisory relay 65.

The locking circuits for line seizing relays 26 through 30 derive ground potential through one of two paths depending upon whether or not station set 1 is off hook. If station set 1 is off hook, ground potential for the locking circuits is traceable from conductor 76, the make portion of transfer contacts 65–2, conductor 75 and break contacts 56–3. If station set 1 is on hook, in which case relay 65 is nonoperated, ground potential for the locking circuits of the line seizing relays is traceable from conductor 76, the break portion of transfer contacts 65–2, conductor 84 and make contacts 62–3 of relay 62 which operates in a manner to be described below.

When line seizing relay 26 is to be locked in the operated condition, the ground on conductor 76 is applied through the make portion of contacts 26–1 to one terminal of the upper winding of relay 26, while the other terminal of the upper winding of relay 26 is applied through make contacts 26–2 and the break portions of transfer contacts 27–2, 28–2, 29–2 and 30–2 to negative battery. If line seizing relay 27, rather than 26, is to be locked operated, the ground potential on conductor 76 is coupled through the break portion of transfer contacts 26–1 to transfer contacts 27–1. A locking path for line seizing relay 27 is thus established comprising the ground on conductor 76, the break portion of transfer contacts 26–1, the make portion of transfer contacts 27–1, the upper winding of relay 27, the make portion of transfer contacts 27–2, the break portions of transfer contacts 28–2, 29–2 and 30–2, and negative battery. Locking paths for maintaining line seizing relays 28, 29 or 30 operated are established in the same manner as the locking paths of the line seizing relays 26 and 27, and consequently need not be further described.

Supervisory signals which command line circuits 3 to seize their respective lines are applied to the windings of the respective relays 78 through the make portions of transfer contacts 26–3, 27–3, 28–3, 29–3 and 30–3. Since line circuits 3 are all identical to each other, only the one associated with line No. 1 is shown in detail. In the embodiment of the invention described herein, supervisory signals are represented by ground potential which, as is the case with the ground potential for the locking circuits of line seizing relays 26 through 30, originate from one of two sources depending upon whether a line is to be seized while station set 1 is in the off-hook or the on-hook condition. If a line is to be seized while the station set is off hook, supervisory relay 65 is operated, as aforementioned, in which case ground potential is applied to transfer contacts 26–3 through 77, break contacts 56–1, conductor 76, the make portion of transfer contacts 65–2, conductor 75 and break contacts 56–3. On the other hand, if a line is to be seized while the station set is on hook, the particular line selection key L1 through L5 associated with the line to be seized is depressed before handset 11 is removed from its cradle. As a result, ground potential on conductor 19 is coupled through the *a* contacts of the depressed line selection key, conductor 20, and diode 79 to a time-out circuit including p-n-p transistor 61 and relay 62. The ground potential coupled through diode 79 is applied directly to the emitter of transistor 61 and is also coupled to negative battery through a potential divider comprising resistors 80 and 81 and break contacts 62–1. In the time-out circuit the base of transistor 61 is connected to a tap on the aforementioned potential divider through resistor 82, and the collector of transistor 61 is connected to negative battery through the winding of relay 62. Accordingly, when a line selection key is depressed, the potential difference created across the emitter-to-base junction of transistor 61 causes current to flow in the collector circuit of that transistor, thereby operating relay 62. Hence, a supervisory ground signal is applied through make contacts 62–3 and conductor 84 to the break portion of transfer contacts 65–2, from which point it is transferred through conductors 76, break contacts 56–1 and conductors 77 to transfer contacts 26–3.

If line selection key L1 is depressed while the station set is in the on-hook condition, in which case line seizing relay 26 is operated through the *b* contacts of key L1 and conductor 21, the aforementioned supervisory ground signal is applied to relay 78 of the No. 1 line circuit 3 through the make portion of transfer contacts 26–3. If line selection key L2 rather than L1 is depressed, line seizing relay 27 is operated through the *b* contacts of key L2 and conductor 22, and the supervisory ground on conductor 77 is applied to relay 78 of the No. 2 line circuit 3 through the break portion of transfer contacts 26–3 and the make portion of transfer contacts 27–3. In like fashion, the supervisory ground signal is applied to corresponding relays 78 of other line circuits 3 depending upon which line selection key is depressed.

The primary function of the time-out circuit of linking unit 2 is to release an established connection between the speech conductors T and R of station set 1 and a seized line if a call is not initiated within a predetermined time after the connection is established. The timing elements of the time-out circuit comprise capacitor 83, which is connected in shunt with resistor 80, resistor 82 and a resistor 85 which connects the junction between resistor 82 and the base transistor 61 to ground. When ground potential is coupled to the anode of diode 79, as aforementioned, capacitor 83 is rapidly charged by negative battery through break contacts 62–1 and resistor 81. At the same time transistor 61 begins to conduct, thereby operating relay 62 through its collector circuit. As a result of the subsequent opening of break contacts 62–1, capacitor 83 is decoupled from negative battery and begins to discharge to ground through resistors 82 and 85. It will be recalled that the keys of station set 1 are nonlocking, and consequently may apply ground potential only momentarily to the emitter of transistor 61. However, when transistor 61 begins to conduct and operates relay 62, ground potential to maintain transistor 61 conducting is applied to the emitter through make contacts 62–2. When capacitor 83 discharges sufficiently, the voltage drop across resistor 85 approaches zero in which case transistor 61 becomes back-biased and ceases conduction. Accordingly, relay 62 releases and removes the supervisory ground formerly applied to transfer contacts 26–3 by make contacts 62–2.

Figure 5:
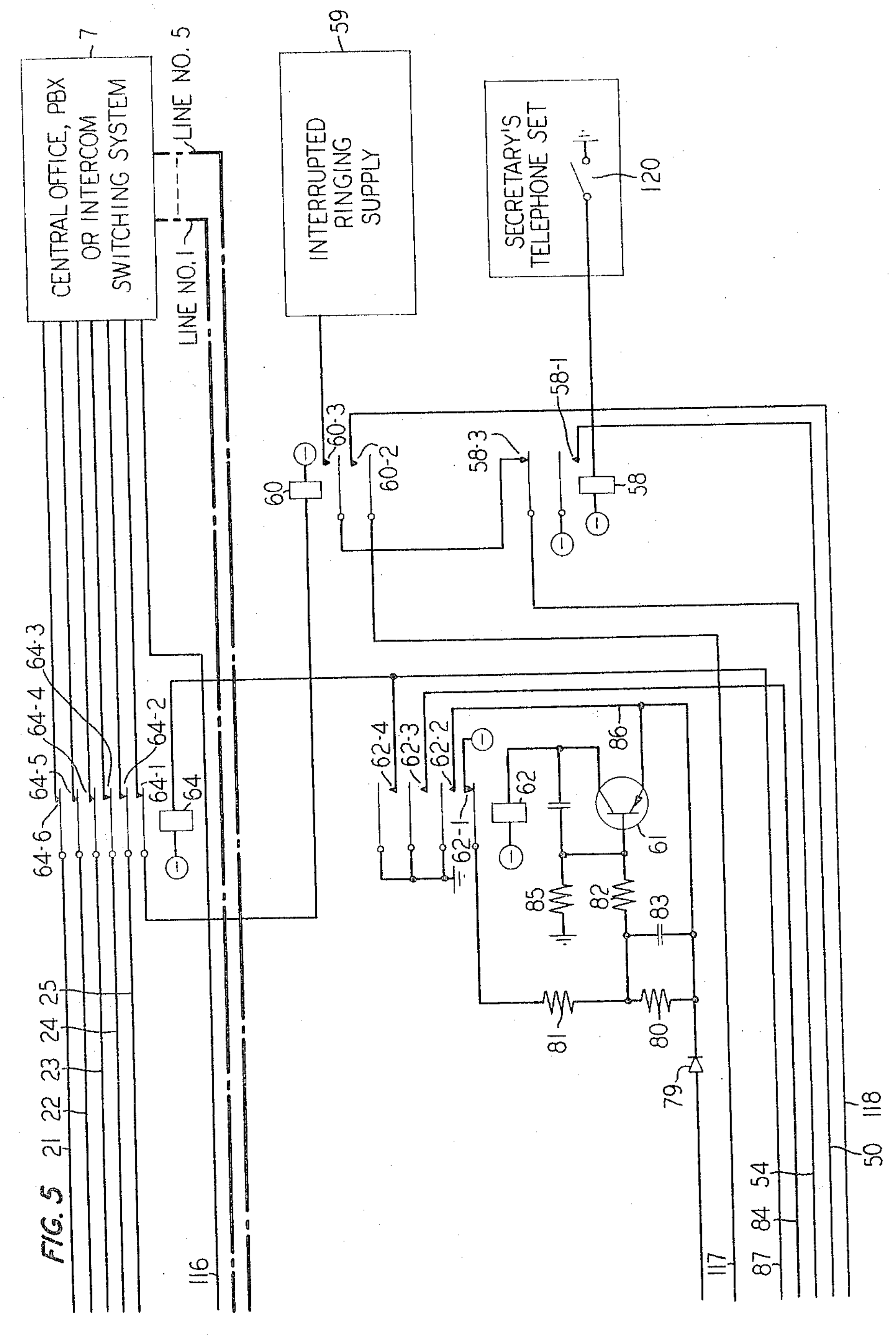

Also included in linking unit 2 is a lock-out arrangement for preventing an incoming call from operating another of the line seizing relays 26 through 30 if any of the line seizing relays is already operated. As shown in FIG. 5, a lock-out relay 64 has one terminal connected to negative battery and the other connectable to ground through either make contacts 62–4 or conductor 87 and make contacts 65–3, depending upon whether station set 1 is in the on-hook or the off-hook condition. Associated with lock-out relay 64 are a plurality of break contacts including 64–2 through 64–6. It will be recalled that during the presence of an incoming call over one of the five lines to which station set 1 has access, ground potential is applied through these last-mentioned break contacts to operate appropriate line seizing relays. Since relay 64 is operated whenever one of the line seizing relays 26 through 30 is operated, i.e., through make contacts 62–4 when station set 1 is in the on-hook condition or through make contacts 65–3 and conductor 87 when the station set is in the off-hook condition, ground potential from switching system 7 cannot be applied through the contacts of relay 64 to operate any other line seizing relays upon the arrival of an incoming call.

Relay 56 of linking unit 2 (FIG. 3) in conjunction with relays 88 of line circuits 3 (FIG. 4) provide circuit means for enabling a line to be maintained in the held, or seized, condition although the line seizing relay associated with that line is released. As shown, the operating path for relay 56 comprising the ground potential on conductor 19, the contacts of the hold key, conductors 47 and 48, the winding of relay 56, conductors 89 and 90, and negative battery. When relay 56 operates through the past just described, make contacts 56–2 operate to apply ground potential to the base of transistor 115 through conductor 91, thereby disabling the previously described preference arrangement by means of which line seizing relay 26 is operated whenever station set 1 is off hook and none of the other line seizing relays are operated. Also, break contacts 56–1 open to interrupt the supervisory ground potential being applied to relay 78 of the line circuit 3 associated with the seized line, and break contacts 56–3 open to interrupt the locking paths which maintain line seizing relays 26 through 30 operated. The operated relay 78 releases immediately, thereby opening make contacts 78–1 and 78–2 which shunt the winding of relay 88. The line seizing relays, however, are of the conventional slow release type, and consequently the particular line seizing relay which is operated at this time is not immediately released. Since the operated one of relays 78 is released before the operated line seizing relay, an operate path for the relay 88 in the line circuit 3 of the line to be held is provided from central office battery (not shown) through the upper conductor of the seized line, the upper winding of relay 88, the make portion of —5 transfer contacts of the not yet released line seizing relay, the switchhook and speech circuit of station set 1, the make portion of the —4 transfer contacts of the not yet released line seizing relay, the lower winding of relay 88 and the lower conductor of the seized line. Consequently, make contacts 88–1 close to form a circuit path from central office battery through the lower winding of relay 88 to provide a proper terminating impedance for maintaining the line in the seized condition even though the speech circuit of the station set 1 is disconnected.

As labeled, relay 56 is also of the slow release variety. Consequently, after the foregoing sequence of events has been accomplished, relay 56 reverts to its original state, thereby reconditioning the locking paths of the line seizing relays for operation when the next line selection key is depressed, and also reconditioning the path through which supervisory ground potential is applied to relay 78 of the line circuit 3 associated with the next line to be seized.

Relays 33 through 39, which are respectively associated with direct-station selection keys D1 through D7 of station set 1, are also situated in linking unit 2. Operating paths for these relays comprise the ground potential on conductor 19, the *d* contacts of direct-station selection keys D1 through D7, and conductors 40 through 46, respectively. Each of the direct-station selection relays 33 through 39 includes two make contacts. The upper make contacts, designated by the numeral 2, are for locking their respective relays in the operated condition through paths comprising ground potential, break contacts 92–1, the upper make contacts and the winding of the operated direct-station relay, conductor 93, break contacts 30–6, 28–6, 27–6, and 26–6, and negative battery. The lower make contacts, designated by the numeral 1, provide switching means for coupling ground potential to the direct-station selection switching system 8 through the appropriate conductors 94, 95, 96, 97, 98, 99 or 100, depending upon which direct-station selection relay is operated. The exact manner in which direct-station selection switching system 8 effects a connection from a calling station, say station set 1 of FIG. 2, to another station set of the system is explained in detail in the aforementioned Breen et al. patent. Suffice it to say that in the present invention direct-station selection is initiated by the suitable application of ground potential to switching system 8 by direct-station selection relays 33 through 39 and conductors 94 through 100.

It is seen from the Breen et al. patent that in order to establish a connection between a calling and a called party via direct-station selection switching system 8, an initiating ground potential must remain applied to switching system 8 until registration of the call has been completed. When registration has been completed, a ground signal originating in system 8 appears on conductor 101 which operates relay 92 through an obvious path to negative battery. Accordingly, break contacts 92–1 open, thereby interrupting the locking paths of relays 33 through 39. Thereafter, the operated one of the direct-station selection relays opens and removes the initiating ground from switching system 8. The direct-station selection call now proceeds in the same manner as any other call established via manual signaling techniques.

The various operating features of the system will now be described in detail.

*Seizure of the preferred outgoing line*

In the embodiment of the invention described herein the preferred line of the station set of FIG. 2 is line No. 1. In other words, when handset 11 is lifted from its cradle and linking unit 2 is idle, speech conductors T and R are automatically connected to line No. 1 without the necessity of depressing line selection Key L1. More specifically, lifting handset 11 from its cradle connects speech circuit 12 of the station set to transfer contacts 26–4 and 26–5 through make contacts 15 and 16 or switchhook 17, and also operates supervisory relay 65 through make contacts 18 of switchhook 17. When supervisory relay 65 operates, ground potential is applied to the emitter of transistor 115 through make contacts 65–4, break contacts 27–7 through 30–7, and conductor 74. As a result, current flows in the collector circuit of transistor 115, thereby operating line seizing relay 26 which is locked in the operated position through the make portions of its transfer contacts 26–1 and 26–2. Also when relay 65 operates, supervisory ground potential is applied to transfer contacts 26–3 through a path comprising conductor 77, break contacts 56–1, conductor 76, the make portion of transfer contacts 65–2, conductor 75 and break contacts 56–3. Furthermore, ground potential is applied through make contacts 65–3 and conductor 87 to operate lockout relay 64, thereby preventing incoming calls from operating any of the other line seizing relays 27 through 30. When line seizing relay 26 operates, as aforementioned, transfer contacts 26–3, 26–4 and 26–5 are actuated. Accordingly, the supervisory ground potential on conductor 77 is applied through the make portion of transfer contacts 26–3 and conductor 79 to operate relay 78 of the line circuit 3 associated with the line No. 1. After relays 26 and 78 have both operated, line No. 1 is connected to speech conductors T and R of station set 1 through make contacts 78–1, 78–2, 26–4 and 26–5, thereby completing the seizure of line No. 1. Varistor 69 in the emitter circuit of transistor 115 is provided for voltage control.

*Selection of a line other than the preferred*

If it is desired to seize a line other than line No. 1, it is necessary to depress the proper line selection key L2 through L5 before lifting handset 11 from its cradle. If the party operating the station set of FIG. 2 desires to seize line No. 2, for example, line selection key L2 is depressed. As a result, line seizing relay 27 is operated owing to the ground on conductor 19 being applied through the *b* contacts of key L2 and conductor 22 to the lower winding of relay 27, and the time-out circuit is energized by the application of the ground on conductor 19 to the emitter of transistor 61 through the *a* contacts of key L2, conductor 20 and diode 79. When ground potential is initially applied to the emitter of transistor 61 through the foregoing circuit, a charging path for capacitor 83 is completed through resistor 81 and break contacts 62–1. Consequently, when line selection key L2 is released, thereby removing the ground potential from the emitter of transistor 61, this transistor continues to conduct for a predetermined time owing to the charge accumulated across the terminals of capacitor 83.

When relay 27 operates, it establishes its own locking path through the make portions of transfer contacts 27–1 and 27–2. Since the handset 11 has not yet been lifted from its cradle, and consequently relay 65 is not yet operated, ground potential for the locking path of relay 27 is supplied through the break portion of transfer contacts 26–1, conductor 76, the break portion of transfer contacts 65–2, conductor 84 and make contacts 62–3. This same ground potential being conducted through the break portion of transfer contacts 65–2 is also applied through conductor 76, break contacts 56–1, conductor 77 and the break portion of transfer contacts 26–3, the make portion of transfer contacts 27–3 and conductor 79 to operate relay 78 of the line circuit 3 associated with line No. 2. As a result, speech conductors T and R of the station set are connected to line No. 2 through the break portion of transfer contacts 26–4 and 26–5, the make portions of transfer contacts 27–4 and 27–5, conductors T2 and R2, and make contacts 78–1 and 78–2 of the line circuit 3 associated with line No. 2.

When handset 11 is lifted from its cradle, supervisory relay 65 is operated through switchhook contact 18. As a result, transfer contacts 65–2 are actuated and transfer the locking and supervisory grounds, which theretofore had been conducted through make contacts 62–3 of the time-out circuit, to a path comprising the make portion of transfer contacts 65–2 and break contacts 56–3. Since line seizing relay 27 is of the slow release type, it remains operated during the short interval in which the armature of transfer contacts 65–2 is being pulled down.

It will be observed that if handset 11 is not lifted from its cradle before the charge on capacitor 83 of the time-out circuit decays sufficiently to cut off transistor 61, the supervisory ground potential operating relay 78 of the line circuit 3 associated with line No. 2 and the locking ground maintaining line seizing relay 27 in the operated condition are removed owing to the release of relay 62. Thus, if a subscriber does not initiate a call by lifting handset 11 from its cradle before transistor 61 times out, the linking unit is restored to a neutral condition.

*Hold*

If the speech conductors T and R are connected to one of the outgoing lines, for example line No. 2, and it is desired to switch the connection to another line, for example to line No. 3, while maintaining line No. 2 in the seized condition, the subscriber first depresses his hold key and next depresses the line selection key, L3 here, associated with the line to which he desires connection. Depression of the hold key results in relay 56 being operted through conductors 47, 48, the winding of relay 56, conductor 90 and negative battery. As explained above, when relay 56 operates, the locking and supervisory grounds for line seizing relay 27 and relay 78 of the line circuit 3 associated with line No. 2, respectively, are removed owing to the operation of break contacts 56–1 and 56–3. Since the line seizing relays are slow to release and relays 78 release immediately, a path for operating relay 88 of line circuit 3 associated with line No. 2 is provided through speech circuit 12 of the station set when make contacts 78–1 and 78–2, which shunt the windings of relay 88, are opened. When relay 88 operates and actuates its make contacts 88–1, a path comprising make contacts 88–1 and the lower winding of relay 88 provides a proper terminating impedance for maintaining the line No. 2 seized by the central office, PBX or intercommunication switching system 7. Shortly thereafter, relay 56 and line seizing relay 27 both release, thereby readying linking unit 2 for seizure of a new line.

It will be noted that although all of the line seizing relays are now released, nevertheless one of the lines, line No. 2, remains seized by the central office, PBX or intercommunication switching system 7. Consequently, a ground signal is applied by switching system 7 to the base of transistor 115 through conductors 91 and 116. As a result, transistor 115 is prevented from conducting at this time and thereby seizing line No. 1, the preferred line, before the new line is seized. When relay 56 first operates, ground is also applied to the base of transistor 115 through conductor 91 and make contacts 56–2. This is a precautionary arrangement to insure that transistor 115 of the preference circuit does not operate in the event that the ground from switching system 7 appearing on conductor 116 is momentarily removed after relay 78 releases but before relay 88 operates. When the line selection key of the new line to be seized is now depressed, key L3 here, line No. 3 is seized in substantially the same manner as heretofore described, with the locking and supervisory grounds being applied through the make portion of transfer contacts 65–2, conductor 75 and break contacts 56–3.

*Release of a seized line*

Two methods for releasing a seized line are, firstly, to replace handset 11 in its cradle and, secondly, to depress a line selection key associated with a line other than the one seized without first depressing the hold key. With regard to the first method, when handset 11 is replaced in its cradle, the contacts of switchhook 17 are all opened. As a result, the principal path energizing relay 65 is interrupted, after which relay 65 releases when capacitor 103 has discharged sufficiently. Accordingly, transfer contacts 65–2 are deactuated, thereby removing both supervisory and locking ground from the operated line seizing relay and relay 78 of the line circuit 3 associated with the seized line.

With regard to the second of the above-mentioned methods of releasing a seized line, assume for purposes of illustration that line No. 2 is seized when the subscriber depresses line selection key L3. In the manner described above, the time-out circuit is operated through the *a* contacts of key L3, and line seizing relay 28 is operated through the *b* contacts of key L3 and conductor 23. When line seizing relay 28 operates, the locking path for line seizing relay 27 through the break portions of transfer contacts 28–1 and 28–2 is broken. Accordingly, line seizing relay 27 releases after its slow release interval, thereby disconnecting conductors T2, R2 and 79 from speech conductors T and R of the station set and supervisory ground, respectively. Thereafter, line No. 3 is seized through the various contacts of line seizing relay 28 in the same manner as if no lines had been seized previously.

*Receipt of an incoming call*

When an incoming call arrives on a line to which station set 1 has access, ground potential originating from the central office, PBX or intercommunication switching system 7 is applied through either break contacts 64–2, 64–3, 64–4, 64–5 or 64–6 depending upon which line the call is arriving, to energize the appropriate line seizing relay 26, 27, 28, 29, or 30. At the same time, a signaling ground from the same source is applied through break contacts 64–1 to operate relay 60 of linking unit 2. Accordingly, the line seizing relay of the line upon which the incoming call is arriving operates, but the line is not yet seized inasmuch as handset 11 has not yet been lifted to operate supervisory relay 65, and the time-out circuit which supplies supervisory ground through make contacts 62–3 and the break portion of transfer contacts 65–2 has not been activated. Also at this time, ringer 53 of the station set is energized by interrupted ringing supply 59 through make contacts 60–3, break contacts 58–3 and conductor 54 to emit an audible tone which indicates the presence of the call.

When the subscriber lifts his handset, supervisory relay 65 is operated through switchhook contacts 18, thereby providing locking ground and supervisory ground to the line seizing relays through the make portion of transfer contacts 65–2 and break contacts 56–3. As a result, the line upon which the incoming call is arriving is automatically seized when the subscriber lifts his handset 11 from its cradle, without the necessity of first determining upon which line the call is arriving and then depressing the line selection key associated with that line. In addition, when relay 65 operates, lockout relay 64 is operated through a path comprising negative battery, the winding of relay 64, conductor 87, make contacts 65–3 and ground. Accordingly, break contacts 64–2 through 64–6 open to prevent other incoming calls from operating any other line seizing relays, and break contacts 64–1 open to release relay 60 and thereby interrupt the energizing path for tone ringer 53.

It is possible for a party operating a station set 1 to seize an idle line even though an incoming call is arriving on a different line to which that station set has access. As aforementioned, when an incoming call arrives on one line, for example on line No. 2, ground potential from the central office, PBX or intercommunication switching system 7 is applied through break contacts 64–5 to operate line seizing relay 27, and at the same time ringing ground is applied through break contacts 64–1 to operate relay 60. However, the line over which the call is arriving, in this case line No. 2, is not seized, nor is the appropriate line seizing relay, in this case, relay 27, locked until the call is answered by handset 11 being lifted from its cradle.

If the called party now wishes to disregard the incoming call and place an outgoing call over another line, say line No. 3, he depresses line selection key L3 before lifting handset 11 from its cradle. As a consequence, line seizing relay 28 is operated through the *b* contacts of line selection key L3 and conductor 23; the time-out circuit is operated through the *a* contacts of the same key and conductor 23; and relay 56 is operated through a path comprising the ground on conductor 19, the *a* contacts of the depressed line selection key, conductors 20 and 117, make contacts 60–2, conductors 118 and 48, the winding of relay 56, conductors 89 and 90, and negative battery. Thereafter, relay 62 of the time-out circuit operates to supply ground potential through make contacts 62–4 to the winding of relay 64 which opens break contacts 64–5 and removes the energizing ground from line seizing relay 27. At the same time, a locking ground for line seizing relay 28 is provided through make contacts 62–3, conductor 87 and the break portion of transfer contacts 65–2.

Line No. 3 is not yet seized, however, owing to the supervisory ground path through break contacts 56–1 being opened. If the supervisory ground path were not opened, relay 78 of the line circuit 3 associated with line No. 2 would be operated during the period of time before line seizing relay 27 releases. Since relay 56 and the line seizing relays have substantially the same release time, relay 56, which remains energized through the depressed line selection key after the locking path for the line seizing relays is broken, releases after relay 27. Consequently, after relay 56 releases, line No. 3 is seized and will remain so if handset 11 is removed from its cradle before the time-out interval expires. If the handset is not removed from its cradle during the time-out interval, the locking and supervisory ground for line seizing relay 28 are removed owing to the release of relay 62, and ground potential is once again applied to energize line seizing relay 27 through break contacts 64–5 owing to the release of lockout relay 64.

*Direct station selection*

When it is desired to initiate a call on a direct-station selection basis, the particular key D1 through D7 is depressed which represents the station set to be called. Thereafter, the time-out circuit is activated through a path comprising the ground on conductor 19, the *c* contacts of the depressed station selection key, conductor 32, and diodes 106 and 79; line seizing relay 29 is operated through a path comprising the ground on conductor 19, the *c* contacts of the depressed direct-station selection key, conductor 32, diode 107, the lower winding of relay 29 and negative battery; and the proper direct-station selection relay 33 through 39 of linking unit 2 is operated through a path comprising the ground on conductor 19, the *d* contacts of the depressed direct-station selection key, the conductor 40 through 56 associated with the depressed key, the winding of the relay 33 through 39 associated with the depressed key, conductor 93, break contacts 30–6, 28–6, 27–6, and 26–6 and negative battery. If handset 11 is now lifted from its cradle before expiration of the time-out period, line No. 4, over which direct-station selection calls proceed, is seized in exactly the same manner as if line selection key L4 had been depressed.

If, for example, direct-station selection key D1 is depressed, relay 33 of linking unit 2 is operated over conductor 40 and is locked over a path comprising negative battery, break contacts 26–6, 27–6, 28–6, and 30–6, conductor 93, the winding of relay 33, make contacts 33–2, condudctor 108, break contacts 92–1 and ground. At the same time, an initiating ground potential is applied to direct-station selection switching system 8 through conductor 109, make contacts 33–1 and conductor 94. After direct-station selection switching system 8 has completed its function, as fully explained in the previously-cited Breen et al. patent, ground potential appears on conductor 101 which completes an operating path for relay 92. Accordingly, break contacts 92–1 open to release the locked direct-station selection relay 33. The call now proceeds and is terminated in exactly the same manner as any other call.

*Buzzer operation*

Buzzer 49 of station set 1 is energized through the linking unit by actuating key 120, which may be associated with a secretary's station set. Actuation of key 120 completes an operating path to ground for relay 58. When relay 58 operates, make contacts 58–1 close and apply operating potential to buzzer 49 through conductor 50. It will be observed that the secretary's signal takes precedence over the signal of an incoming call in that when relay 58 is operated, break contacts 58–3 are open and interrupt the path applying interrupted ringing potential to tone ringer 53.

In all cases it is to be understood that the embodiment of the invention described herein is merely illustrative, and that numerous modifications, adaptations and arrangements may be derived without departing from the scope of the invention.

What is claimed is:

1. In combination with a key telephone set employing nonlocking keys, an auxiliary linking unit comprising an individual relay associated with each of said keys, first means for operating said relays when said respective keys are actuated, second means for operating said relays upon the arrival of calls to said set, means for locking said relays in the operated condition, timing means for releasing a relay locked in the operated condition a predetermined time after said relay has been operated by said first means, and lockout means for preventing the operation of any others of said relays when any one of said relays has been operated by said second means.

2. In combination with a key telephone set having a speech circuit and a plurality of non-locking keys individually corresponding to a plurality of lines to which said speech circuit is connectable, an auxiliary linking unit comprising an individual relay associated with each of said lines to which said speech circuit is connectable, means operated by said respective relays for severally connecting said lines to said speech circuit, first means including said keys for individually operating said relays, second means for individually operating said relays upon the arrival of calls to said set over respective ones of said lines, means for individually locking said relays in the operated condition, timing means operative in response to said keys for releasing a relay locked in the operated condition a predetermined time after said relay has been operated by said first means, and lockout means for preventing the operation of any others of said relays by said second means when any one of said relays has been operated by said second means.

3. In combination with a key telephone set having a handset, a speech circuit connected to said handset, a plurality of nonlocking keys individually corresponding to a plurality of lines to which said speech circuit is connectable and a switchhook operated by said handset, an auxiliary linking unit comprising an individual relay associated with each of said lines to which said speech circuit is connectable, means operated by said respective relays for severally connecting said lines to said speech circuit, first means including said keys for individually operating said relays, second means for individually operating said relays upon the arrival of calls to said set over respective ones of said lines, third means for operating a particular one of said relays when said switchhook is operated and the others of said relays are unoperated, means for individually locking said relays in the operated condition, timing means operative in response to said keys for releasing a relay locked in the operated condition a predetermined time after said relay has been operated by said first means, and lockout means for preventing the operation of any others of said relays by said second means when any one of said relays has been operated by said second means.

4. In combination with a key telephone set having a switchhook, a pair of speech conductors and a plurality of nonlocking keys individually corresponding to a plurality of lines to which said pair of speech conductors is connectable, an auxiliary linking unit including means for automatically providing primary connections between said pair of speech conductors and individual ones of said lines upon the arrival over said respective lines of incoming calls to said set, and means operative in response to the actuation of said keys for releasing said automatically provided connections and establishing a secondary connection between said speech conductors and said lines which correspond to said actuated keys, circuit means for releasing said secondary connection and re-establishing said primary connection a predetermined time interval after the actuation of said keys, and means responsive to the operation of said switchhook before the expiration of said time interval for disabling said circuit means.

References Cited by the Examiner

UNITED STATES PATENTS

| | | | |
|---|---|---|---|
| 3,057,963 | 10/1962 | Gray | 179—42 |
| 3,150,238 | 9/1964 | Carter | 179—99 |

KATHLEEN H. CLAFFY, *Primary Examiner.*

J. W. JOHNSON, R. P. TAYLOR, *Assistant Examiners.*